(12) United States Patent
Kipurs et al.

(10) Patent No.: US 11,492,113 B1
(45) Date of Patent: Nov. 8, 2022

(54) OUTDOOR SECURITY CAMERA DRONE SYSTEM SETUP

(71) Applicant: Alarm.com Incorporated, Tysons, VA (US)

(72) Inventors: Agris Kipurs, Jelgava (LV); Ilja Nevdahs, Carnikava (LV)

(73) Assignee: Alarm.com Incorporated, Tysons, VA (US)

( * ) Notice: Subject to any disclaimer, the term of this patent is extended or adjusted under 35 U.S.C. 154(b) by 284 days.

(21) Appl. No.: 16/839,434

(22) Filed: Apr. 3, 2020

Related U.S. Application Data

(60) Provisional application No. 62/828,909, filed on Apr. 3, 2019.

(51) Int. Cl.
*B64C 39/02* (2006.01)
*B64D 47/08* (2006.01)
*G05D 1/10* (2006.01)
*H04W 4/024* (2018.01)

(52) U.S. Cl.
CPC .......... *B64C 39/024* (2013.01); *B64D 47/08* (2013.01); *G05D 1/106* (2019.05); *B64C 2201/141* (2013.01); *H04W 4/024* (2018.02)

(58) Field of Classification Search
CPC ............... B64C 39/024; B64C 2201/141; G05D 1/106; B64D 47/08; H04W 4/024
See application file for complete search history.

(56) References Cited

U.S. PATENT DOCUMENTS 9,508,263 B1 * 11/2016 Teng ................ B64C 39/024
9,533,759 B2    1/2017 Jones et al.
9,618,940 B1 *  4/2017 Michini ............. G06Q 50/16
(Continued)

FOREIGN PATENT DOCUMENTS

EP    2813914 A1 * 12/2014 .......... G05D 1/101
EP    2927771       10/2015
(Continued)

OTHER PUBLICATIONS

Chowdhary et al., "GPS-Denied Indoor and Outdoor Monocular Vision Aided Navigation and Control of Unmanned Aircraft," Journal of Field Robotics, 2013, 45 pages.

*Primary Examiner* — Peter D Nolan
*Assistant Examiner* — Kenneth M Dunne
(74) *Attorney, Agent, or Firm* — Fish & Richardson P.C.

(57) ABSTRACT

A security monitoring system may implement a method for surveilling an outdoor area using a drone. The method involves receiving an input to initiate a pre-surveillance operation. The input indicates a type of pre-surveillance operation to be performed in the outdoor area. The drone may be configured according to the input and may then perform the pre-surveillance operation to obtain data indicative of environmental features in the outdoor area. A flight trajectory path for the drone is generated based on the data indicative of the environmental features in the outdoor area. The flight trajectory path includes a path for the drone to move within the outdoor area. The drone then performs a detailed surveillance of the outdoor area according to the flight trajectory path. A graphical representation of the outdoor area is generated based on data obtained from performing the surveillance of the outdoor area.

20 Claims, 5 Drawing Sheets

(56) References Cited

U.S. PATENT DOCUMENTS

| | | | | |
|---|---|---|---|---|
| 10,414,052 B2* | 9/2019 | Deyle | ................... | B25J 11/008 |
| 2007/0156286 A1* | 7/2007 | Yamauchi | ............ | G05D 1/0278 |
| | | | | 700/245 |
| 2012/0019522 A1* | 1/2012 | Lawrence | ............... | G06T 17/00 |
| | | | | 345/419 |
| 2014/0025230 A1* | 1/2014 | Levien | ................. | G05D 1/005 |
| | | | | 701/2 |
| 2015/0336667 A1* | 11/2015 | Srivastava | ............. | G05D 1/101 |
| | | | | 701/2 |
| 2015/0350614 A1* | 12/2015 | Meier | ................ | H04N 5/23229 |
| | | | | 348/144 |
| 2016/0116914 A1* | 4/2016 | Mucci | .................. | B64C 39/024 |
| | | | | 701/2 |
| 2017/0021941 A1* | 1/2017 | Fisher | ................... | B64C 39/024 |
| 2017/0069214 A1* | 3/2017 | Dupray | ............... | G08G 5/0021 |
| 2017/0076612 A1* | 3/2017 | Takahashi | ............. | G06V 20/13 |
| 2017/0083027 A1* | 3/2017 | Tao | ...................... | G08G 5/0069 |
| 2017/0187993 A1* | 6/2017 | Martch | ........... | G08B 13/19684 |
| 2017/0247108 A1* | 8/2017 | Ljubuncic | ............. | G08G 5/0013 |
| 2018/0004231 A1* | 1/2018 | Michini | .................. | G01C 21/00 |
| 2018/0016006 A1* | 1/2018 | Tian | .................... | G06V 20/176 |
| 2018/0067502 A1* | 3/2018 | Chi-Hsueh | ............. | B64D 47/08 |
| 2018/0233007 A1* | 8/2018 | Williams | ........... | G08B 13/1965 |
| 2020/0098273 A1* | 3/2020 | Kim | ....................... | G08G 5/006 |
| 2020/0317335 A1* | 10/2020 | Sugaya | ............... | G08G 5/0034 |

FOREIGN PATENT DOCUMENTS

| | | | | |
|---|---|---|---|---|
| EP | 3786584 A1 * | 3/2021 | ............. | G01C 21/32 |
| FR | 3015333 A1 * | 6/2015 | ............. | B25J 9/1682 |
| JP | 2014040231 A * | 3/2014 | ........... | G05D 1/0016 |
| JP | 2018133010 A * | 8/2018 | | |

* cited by examiner

OUTDOOR SECURITY CAMERA DRONE SYSTEM SETUP

CROSS-REFERENCE TO RELATED APPLICATION

This application claims the benefit of U.S. Application No. 62/828,909, filed Apr. 3, 2019, which is incorporated by reference.

TECHNICAL FIELD

This specification generally relates to surveilling areas using autonomous drones.

BACKGROUND

When an emergency or alarm event, such as a fire, occurs in an outdoor area, an immediate response is often required. If such circumstances, visibility and knowledge of the outdoor area may be important to provide an immediate response and safely navigate through the environment and topology of the outdoor area. However, often times such knowledge is unavailable, and responses to the emergency or alarm event may be delayed or set back.

SUMMARY

Innovative aspects of the subject matter described in this specification relate to surveilling an outdoor area using a security camera drone (SCD). A security monitoring system may be installed in the outdoor area and configured to surveil the outdoor area to obtain spatial and semantic context of the outdoor area.

In some implementations, a task for a SCD may include reacting to security events in a timely manner and navigating through an outdoor area in a manner that respects the private property rights or privacy of entities with legal interests in the outdoor area. In some implementations, users or installers of the security monitoring system may want to restrict where the SCD is allowed to travel and where it is not allowed to travel. In some implementations, users or installers of the security monitoring system may want to identify particular points of interest that the SCD should surveil.

According to innovative aspects of the subject matter described in this specification, a security monitoring system may implement a method for surveilling an outdoor area using a drone. The process involves performing a pre-surveillance operation in which a user may manually or through a remote control move a SCD through the outdoor area. The SCD may record the path taken by the SCD during the pre-surveillance operation and obtain data such as images of the environment around the path taken by the SCD. The user may provide additional information that describes particular points of interests and restricted zones.

After obtaining data from the pre-surveillance operation and any optional data the use would like to provide, a flight path is generated to perform a more detailed surveillance of the outdoor area. The flight path follows any restrictions placed by the user and avoids obstacles such as trees or buildings. The SCD may then execute the flight mission trajectory path by traveling along the flight path and collecting more information about the outdoor area. The collected information is used to generate a graphical representation, e.g., a map, of the outdoor area.

Surveilling geographical zones can be beneficial for several reasons. For example, surveilling a particular area allows a system that is located remotely from the particular area, to display or obtain information about the area and other physical features and details of the particular area. The details may include environmental details (e.g., temperature, humidity, pressure details), physical details (e.g., buildings, impediments, trees, fixtures, roads, ponds, canals, etc.), and various other types of features present in the particular area. The surveilling may be performed for various reasons, including, for example to perform surveilling in response to a security alarm event. Additionally, when roads and cities are surveilled, computer systems and/or users may use data obtained from the surveillance to determine various routes that can be taken to navigate through the roads and cities.

Other implementations of this aspect include corresponding systems, apparatus, and computer programs recorded on computer storage devices, each configured to perform the operations of the methods.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The accompanying figures and descriptions disclose implementations that describe how outdoor areas can be efficiently and effectively surveilled. The descriptions refer to a user who may be a person or entity operating an autonomous security camera drone (SCD) or interested in surveilling the outdoor area. The user may define and configure multiple parameters of surveillance of the surveilled area by the SCD, which may be part of a security monitoring system.

In general, a SCD may refer to an unmanned aerial vehicle or device (UAV). A SCD may have one or more base stations which can be used to park the SCD and/or charge the SCD. The SCD may include one or more processors, a power unit that includes a battery chamber and a charging unit, a navigation unit, one or more engines or propulsion units, and one or more sensors. The one or more processors are configured to execute compute code, such as algorithms, that, when executed, help execute operations and action performed by the SCD as described in this specification. For example, a processor may execute code that facilitates movement of the SCD from one place to another. The processor may also include or be connected to a wireless communication unit that is configured to facilitate wireless communication between the SCD and other electronic devices.

The battery chamber in the power unit includes a receptacle to hold one or more batteries that provide power to the SCD when the SCD is not connected through a wired connection to a power source. The charging unit is configured to facilitate charging of the SCD. In some implementations, the charging unit may include a port that can wirelessly communicate with another device, such as a base station, for the wireless transfer of energy to charge the SCD in a wireless manner. In some implementations, the charging unit may include a port configured to provide a wired connection to a power source such as an electric wall outlet, battery charging device, or base station. The batteries of the SCD may then be charged by virtue of the connection provided through the charging unit.

The navigation unit is configured to facilitate movement of the SCD. The navigation unit may include a processor, as described above and below, and a location determining unit, e.g., a Global Positioning System (GPS) module, to determine the real-time location of the SCD. The navigation unit may include or be connected to an accelerometer, gyroscope, compass, altimeter, motion sensor, and any other suitable devices to determine the position, orientation, and/or movement of the SCD. In some implementations, the navigation unit may include a radar to determine a distance to one or more physical objects around the SCD.

The SCD may include or be connected to one or more sensors. In general, various types of sensors may be included or connected to the SCD. For example, the sensors may include, but are not limited to, optical sensors, light sensors, air sensors, pressure sensors, temperature sensors, humidity sensors, and motion sensors. In some implementation, the sensors may include a camera to acquire still or moving images, such as images of different environments and/or spaces.

Using a SCD to perform surveillance may be advantageous because a SCD may move through an area vertically and horizontally without significant deterrence from impediments such as trees, benches, or even water. In addition, with information about a particular type of layout or configuration, a SCD may be programmed to perform surveillance for other outdoor areas with similar layout. This improves the efficiency and time spent surveilling outdoor areas during a security alarm event. In general, a security alarm event may refer to an event related to a security threat or emergency such as an earthquake, fire, outbreak of violent behavior, and flooding.

Figure 1:
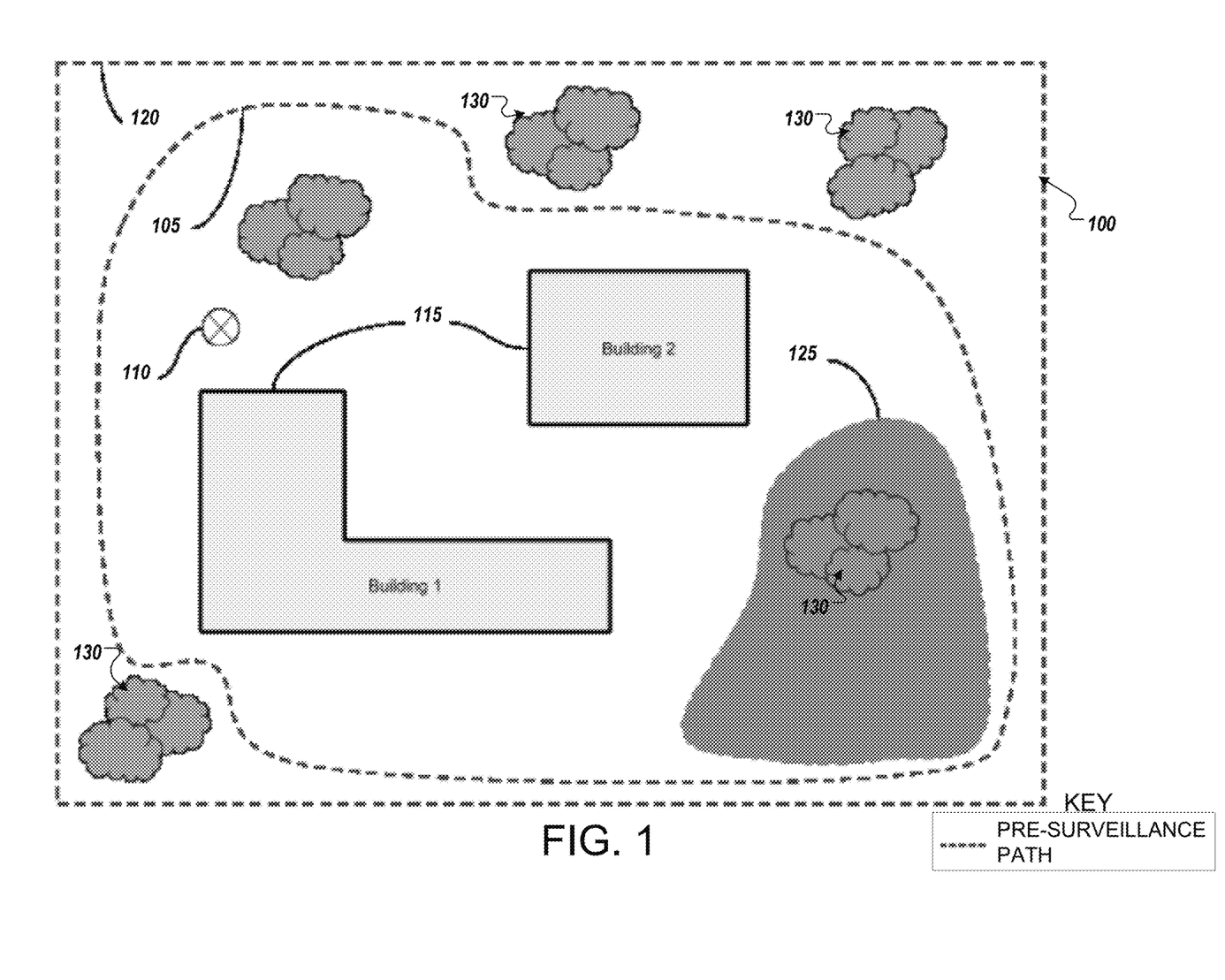
FIG. 1 illustrates an example layout of an outdoor area with example pre-surveillance trajectories of a SCD.

FIG. 1 illustrates an example layout of an outdoor area 100 with example pre-surveillance trajectories of a SCD. FIG. 1 shows an outdoor area 100 that includes buildings 115, trees 130, and a no-fly zone 125. In the example of FIG. 1, a user may position a SCD at a base station location 110. The user may be interested in performing a surveillance of the outdoor area 100. The user may initiate the surveillance through a graphical user interface on a user device, base station, or the SCD. For instance, the user may open an outdoor area surveilling application and select a surveillance recording option. In some implementations, the user may give the surveillance a particular name, for example, "Outdoor Area X Surveillance," after selecting the surveillance recording option or after the surveilling has been recorded. In response, the SCD and/or base station may activate a visual indicator, such as an LED light, to indicate that the SCD is ready for performing a surveillance operation. While initiating the surveillance, the user may also check to see if components of the SCD such as sensors and/or camera are working properly and can sense the environment.

After initiating the surveillance, the user may select an initial point, e.g., the base station location 110, to begin the surveilling. In some implementations, to select the initial point, the user may physically move the SCD to the initial point and indicate that the real-time position is the initial point. In some implementations, the user may provide location coordinates of the initial point through a graphical user interface on the user device, such as a computer or smart phone, which can wirelessly transmit the location coordinate information to the SCD or a base station capable of providing instructions to the SCD for execution. In some implementations, the user may provide location coordinates of the initial point through a user interface of the base station. In some implementations, if the user is not personally aware of the location coordinates, the user may request the SCD or base station to determine the location coordinates of the initial point after the user has moved the SCD to the initial point. The SCD and/or base station may use any location determining system, such as GPS, to determine the SCD's location coordinates.

In some implementations, starting from the initial point, the user may hold the SCD and move through or around the outdoor area 100 the user wants surveilled. For example, the user may walk along an approximate trajectory 105 to define a surveilled zone or a perimeter 120 of the area to be surveilled. In the instance that the user walks along trajectory 105, in some implementations, the user may provide an indication that the user will be walking along a trajectory path through an outdoor area using the user interface. The SCD may then configure itself to record a trajectory path. As shown in FIG. 1, when the user walks along trajectory 105, the user may walk around the buildings 115, the no-fly zone 125 and between some trees 130 and buildings 115.

In the instance that the user walks around the perimeter 120, in some implementations, the user may provide an indication that the user will be walking along a perimeter of an outdoor area using the user interface. The SCD may then configure itself to record a perimeter path that encloses an area to be surveilled. As shown in FIG. 1, when the user walks along the perimeter 120, the user may walk around the buildings 115, the no-fly zone 125, and the trees 130.

While the user is carrying the SCD along trajectory path 105 or perimeter 120, the SCD may record the path taken during this pre-surveillance phase and store it in the memory of the SCD or in another part of the monitoring system. For example, the SCD may determine the location coordinates of different points in the path and store the location coordinates in the memory. The location coordinates may be determined using any suitable location determining system, e.g., a Global Positioning System (GPS) system. In some implementations, the user may return the SCD to the base station location 110 and/or place the SCD in the base station location located at the base station location 110. Although the examples above described a user carrying the SCD, in some implementations, the user may use a remote control to control the movement of the SCD to move in the manner described above.

During the above-described pre-surveillance phase, as the SCD moves along a path on its own or while being held the user, sensors in the SCD may be sensing the environment. For example, in some implementations, when the SCD is moving from the initial point to a terminating point, the SCD may perform additional operations such as scanning or taking videos or pictures of the surrounding environment. The SCD may take multiple sensor readings, e.g., from cameras, accelerometers, and/or global positioning system (GPS) sensors. The SCD may record the sensor readings and/or transmit the sensor readings to the base station or a security network server.

In some implementations, the user may also provide additional information about an area. For example, during, before, or after moving the SCD long a path, the user may indicate that an area to the left or to the right of a particular portion of the path has a tree, a building, a point of interest (POI), a zone of interest (ZOI), or a no-fly zone. The user may provide this information through the user interface. For example, the user may draw a surveillance zone with a trajectory path and/or perimeter path on top of the drawing with annotations of a POI, building, or no-fly zone. If available, the user may also upload or draw a map of the outdoor area 100 which may include details of features, such as trees and buildings, located in the outdoor area. If such details are not included, the user may add any annotations to the uploaded map. The annotations may be represented on the map using various types of shapes, sizes, figures, and text that would be understood by a SCD as referring to particular features.

One mechanism that allows enhanced user privacy and control is the ability to use restricted zones. A restricted zone may refer to a zone in which the SCD or other security personnel may not enter. A restricted zone may also be referred to as a "no-fly zone" because the SCD is not allowed to enter the restricted zone. For example, if there is a residential, military, or secure zone that the user cannot or does not want to surveil, that zone can be designated by the user as a "no-fly zone."

Based on the data collected from the sensors and optionally from the user, the SCD may determine a surveillance zone and any features within the surveillance zone. For example, the SCD may identify locations around or through which the SCD moved during the pre-surveillance phase, and determine that the identified locations are part of the zones to be surveilled. If a perimeter option is selected by the user, the SCD may determine areas within the perimeter other than obstacles and no-fly zones as being areas to be surveilled.

In some implementations, locations into which the SCD was not taken may be identified as a potential obstacle or no-fly zone. For example, if a user did not move the SCD through a building and instead walked around a building, such as buildings 115 in FIG. 1, the SCD may determine, based on images of the buildings 115 and/or the locations into which the SCD was not taken, that the buildings 115 are an obstacle. In some implementations, obstacles may be designated as no-fly zones, which is an area into which the SCD may not enter. Additionally, the SCD may determine the presence of obstacles, e.g., trees, buildings, in the surveillance zone based on the sensor readings or images captured by a camera. For example, using any suitable object recognition technique, the SCD may detect obstacles in images obtained by the SCD's camera.

In some implementations, after the walk-through or pre-surveillance phase is complete, the SCD may build and record a preliminary two or three-dimensional map or graphical representation of one or more portions of the surveillance zone. The preliminary map or graphical representation may be generated based on data collected by sensors of the SCD and/or the location coordinates of the various points traversed by the SCD during the pre-surveillance phase.

Figure 2:
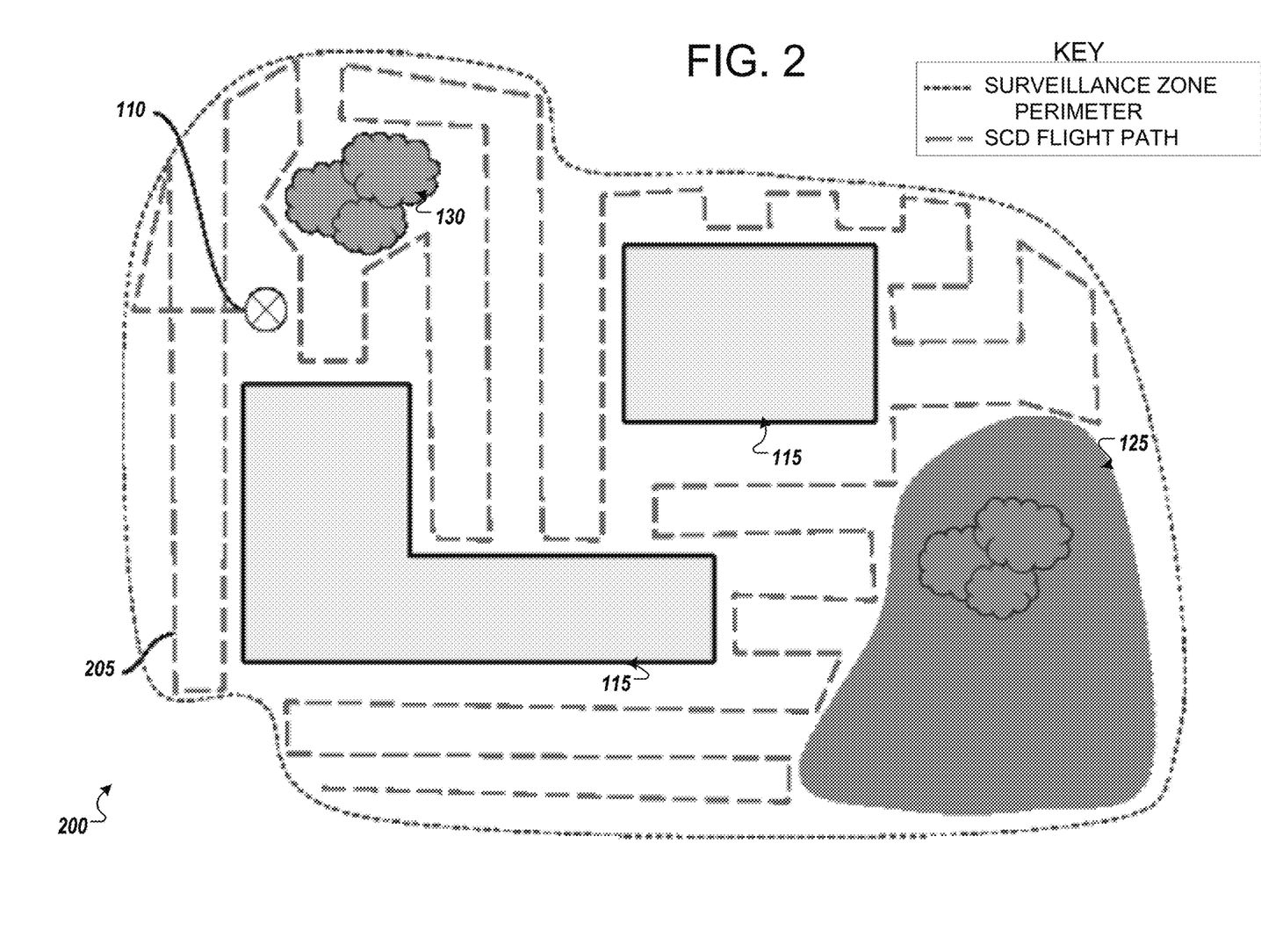
FIG. 2 illustrates an example layout of an outdoor area and an example surveillance trajectory of a SCD.

FIG. 2 illustrates an example layout of an outdoor area and an example surveillance flight path of a SCD. The user or the SCD may initiate a detailed surveillance phase by providing an input through a user interface on the SCD or base station. In some implementations, the detailed surveillance phase may be triggered by an external event, time, system, or trigger such as an emergency or alarm event. In some implementations, the detailed surveillance phase may be executed autonomously or according to a schedule and may not require any user intervention.

During the detailed surveillance phase, the SCD may take off and use on-board sensors and cameras to build a more detailed two or three-dimensional map of the surveillance zone. The SCD may fly in a predetermined or dynamically calculated pattern in order to cover the surveillance zone while avoiding obstacles and/or no-fly zones. For example, in some implementations, the SCD may fly along a dynamically-calculated path, which may be calculated in order to cover the surveillance zone while avoiding obstacles and/or no-fly zones. The dashed lines 205 in FIG. 2 illustrate a dynamically-calculated flight path of the SCD taken during detailed mapping. The dynamically-calculated flight path may be determined using various suitable navigation tools, and may be determined by the base station, security network server, or the SCD.

In some implementations, the SCD may use the trajectory path 105 to select or prioritize paths the user took during the pre-surveillance phase around buildings or trees, to identify space that the SCD has not yet surveilled, and/or to avoid certain areas that were not covered during the pre-surveillance phase.

The SCD may have a radar and/or sensors communicatively coupled to one or more processors configured to execute compute code, such as algorithms, that, when executed, help to allow the SCD to identify, via sensor data obtained by the sensors and/or radar, additional details that may be not have been captured earlier such as buildings, fence, trees, and other obstructions and impediments that could hinder the SCD's movement. The SCD may use various suitable image processing and object detection techniques to identify objects in or around its flight path. In some implementations, the SCD may alter its flight path if the radar detects a likely collision with an object in its path. For instance, in FIG. 2, the SCD modified its flight path to avoid collisions with tree 130 and buildings 115.

The SCD may identify areas that the user did not go through and may, in response, avoid going through such areas. For example, with reference to the layout shown in FIG. 2, the SCD may have identified area 125 as a no-fly zone during or after the pre-surveillance phase and, consequently, does not fly through the no-fly zone 125 during the surveillance phase.

Figure 3:
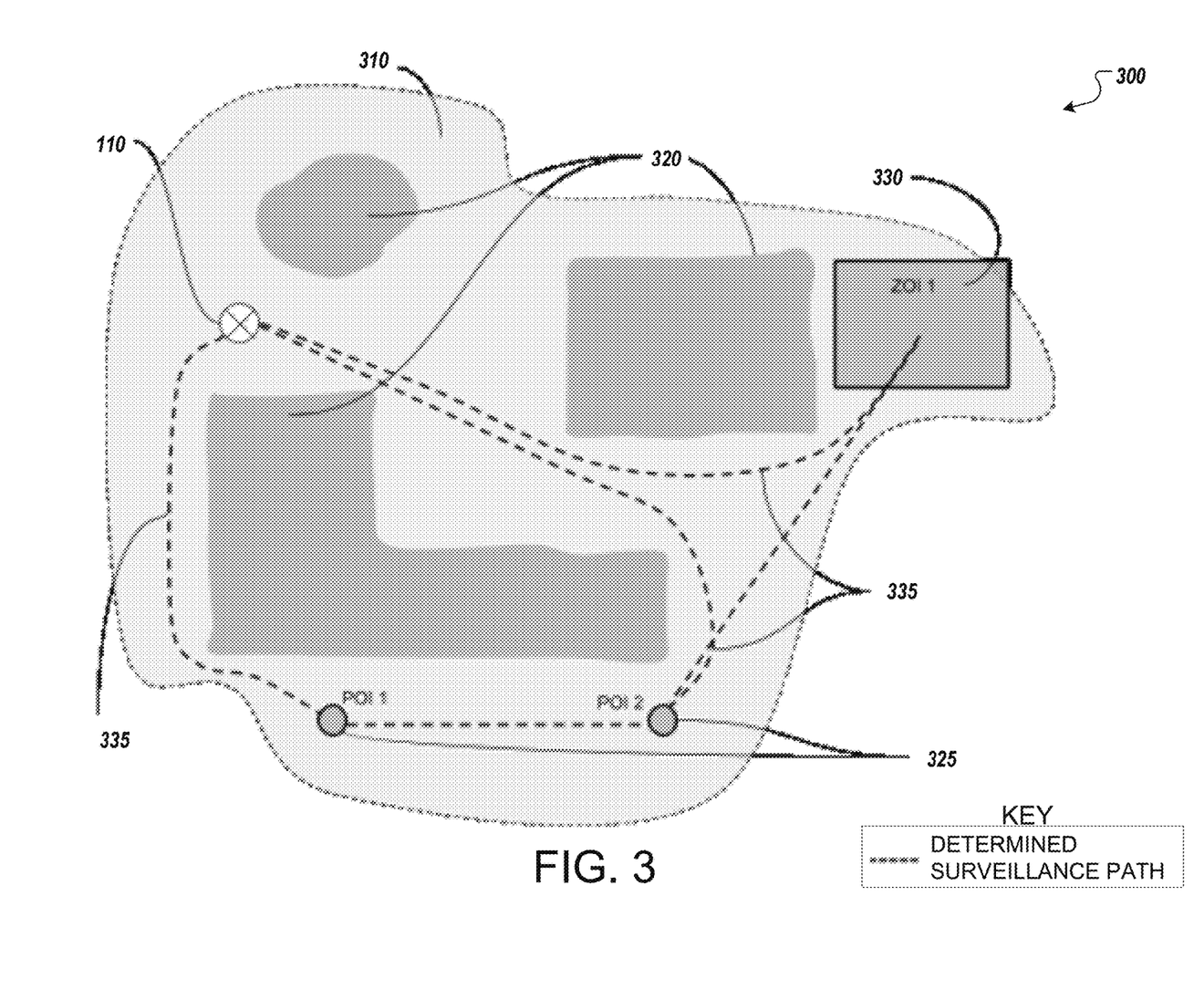
FIG. 3 illustrates an example layout of an outdoor area and depictions of example SCD trajectory paths.

FIG. 3 illustrates another example layout of an outdoor area and example surveillance flight paths of a SCD. In particular, FIG. 3 depicts a surveillance zone 300 with a base station location 110, areas free of obstacles 310, areas with obstacles 320, points of interest (POIs) 325, a zone of interest (ZOI) 330, and determined paths 335 between the base station location 110 and the POIs 325 and ZOIs 330.

In the example shown in FIG. 3, before, during, or after the pre-surveillance phase, the user may specify one or more POIs 325 or one or more ZOIs 330 that the user is particularly interested in getting surveilled. In general, various techniques are available for the user to specify a POI or ZOI. For instance, in some implementations, the user may draw a map and identify a region associated with a POI or ZOI. After drawing or identifying the POI or ZOI, the user may confirm that the user has completed drawing or identifying the POI or ZOI. The security system may receive the user input and render a map of the surveillance zone 300 with the POI or ZOI identified in the map.

In some implementations, the user may request access to a graphical representation of the surveillance zone 300. The security system receives the request, and may determine if the user is authorized to access the graphical representation. If the user is authorized, the security system may send a copy of the graphical representation to the user device.

In some implementations, the user may then provide coordinates of a particular location on the graphical representation that the user would like to identify as a POI or a ZOI. The security system may receive the coordinates from the user device, and may mark the coordinates on the graphical representation of the surveillance zone 300 as the POI or ZOI.

In some implementations, if the graphical representation allows the user to select certain locations, zones, or buildings, the user may select a location, zone, or building as the POI or ZOI through a user interface on the user device. The security system may receive the user selection and mark the location, zone, or building corresponding to the user selection as the POI or ZOI.

In some implementations, the user may specify certain types of buildings, locations, or zones as POIs or ZOIs. For example, the user may specify that any location with water is a POI or that student centers on a campus are a ZOI. Upon receiving data indicative of the type of building, location, or zone that the user is interested in, the security system may process and filter the graphical representation to identify locations corresponding to the type of building, location, or zone that the user is interested in. For example, the security system may designate locations with water as no-fly zones.

In some implementations, when conducting the pre-surveillance and moving the SCD, the user may identify the location that the SCD is present at as a POI or ZOI.

In some implementations, the user may specify POIs 325 and ZOIs 330 when the user is not interested in having the SCD perform a surveillance of the entire surveillance zone (which may include areas such as area 310). This can be advantageous in several scenarios, for example, when there is limited time to perform the surveillance or when the SCD does not have sufficient battery power to surveil the entire surveillance zone.

When the user inputs one or more POIs 325 or ZOIs 330, the SCD may determine the shortest path between the initial point and the POIs 325 and the ZOIs 330 that avoids any known obstacles. In particular, the SCD system may use collected map data and user defined POIs 325, ZOIs 330, and No-Fly Zones to generate paths for the SCD (and/or one or more other or additional SCDs) to traverse (e.g., while surveilling) the surveillance zone. For example, the SCD may determine a shortest path or circuit through the surveillance zone, or a shortest circuit to traverse all or a majority of the surveillance zone including all POIs 325 and ZOIs 330. In some cases, the SCD may determine one or more safe paths from one or more points to one or more other points in the surveillance zone. For example, the SCD system may determine a shortest safe path between each of the POIs 325 and the ZOIs 330 or a shortest safe circuit between all of the POIs 325 and ZOIs 330. In FIG. 3, the SCD determine that paths 335 are the shortest paths between the base station location 110 and the POIs 325 and the ZOI 330 without obstacles such as buildings in the areas 320 with obstacles.

In some implementations, the security monitoring network may determine that a single SCD does not have sufficient battery power to perform a surveillance operation. In such cases, multiple SCDs and/or multiple base stations may be deployed to perform the detailed surveillance. For example, in some cases, a single SCD may be used, but the calculated flight path may include pit stops at one or more base stations associated with the SCD for recharging the batteries of the SCD. In some cases, different portions of a surveillance area may be divided and assigned to different SCDs, which may perform the detailed surveillance of a surveillance area. Data from the various SCDs may be combined to gather data for the whole surveillance area.

After the detailed surveillance phase is complete, the data gathered during the detailed surveillance phase is processed to generate a detailed graphical representation of the outdoor area 100. The detailed graphical representation may include a two dimensional representation, a three dimensional representation, or another type of graphical representation of the surveillance zone such as a map. The graphical representation may include models, maps, images, symbols, icons, and, in general, any representation that provides visual information about a space in the outdoor area 100.

In some implementations, artificial intelligence and/or machine learning may be used to recognize, classify, and mark buildings, walls, rooms, animals, trees, and other structures. The generated map may be validated and refined by other computing devices or by a human operator. For example, a human operator may enter the surveilled zone to verify that the generated map is consistent with the actual space being mapped. As another example, a computing device may corroborate the location of fences, walls, and other physical features in the map by comparing the generated map with previously stored maps. The previously stored maps may be stored in local or remote databases, or may have been obtained from previous mapping instances.

In some implementations, if another system, such as a cloud-based system that is connected to the security monitoring system, has additional information about the property, such as locations of sensors and/or security zones, this additional information may be added to the map. More generally, after a map has been generated, the map may be manipulated, modified, or annotated to provide additional information to the security monitoring system. The annotations may be based on information obtained from the user or from one or more sensors of the security monitoring system.

After the map is generated, the generated map may be presented to the user through a user interface on a user device such as a portable electronic device. The user may use the GUI to adjust the map, e.g., by defining Surveillance Zones, No-Fly Zones, Points of Interest, Zones of Interest, and/or Objects of Interest.

Figure 4:
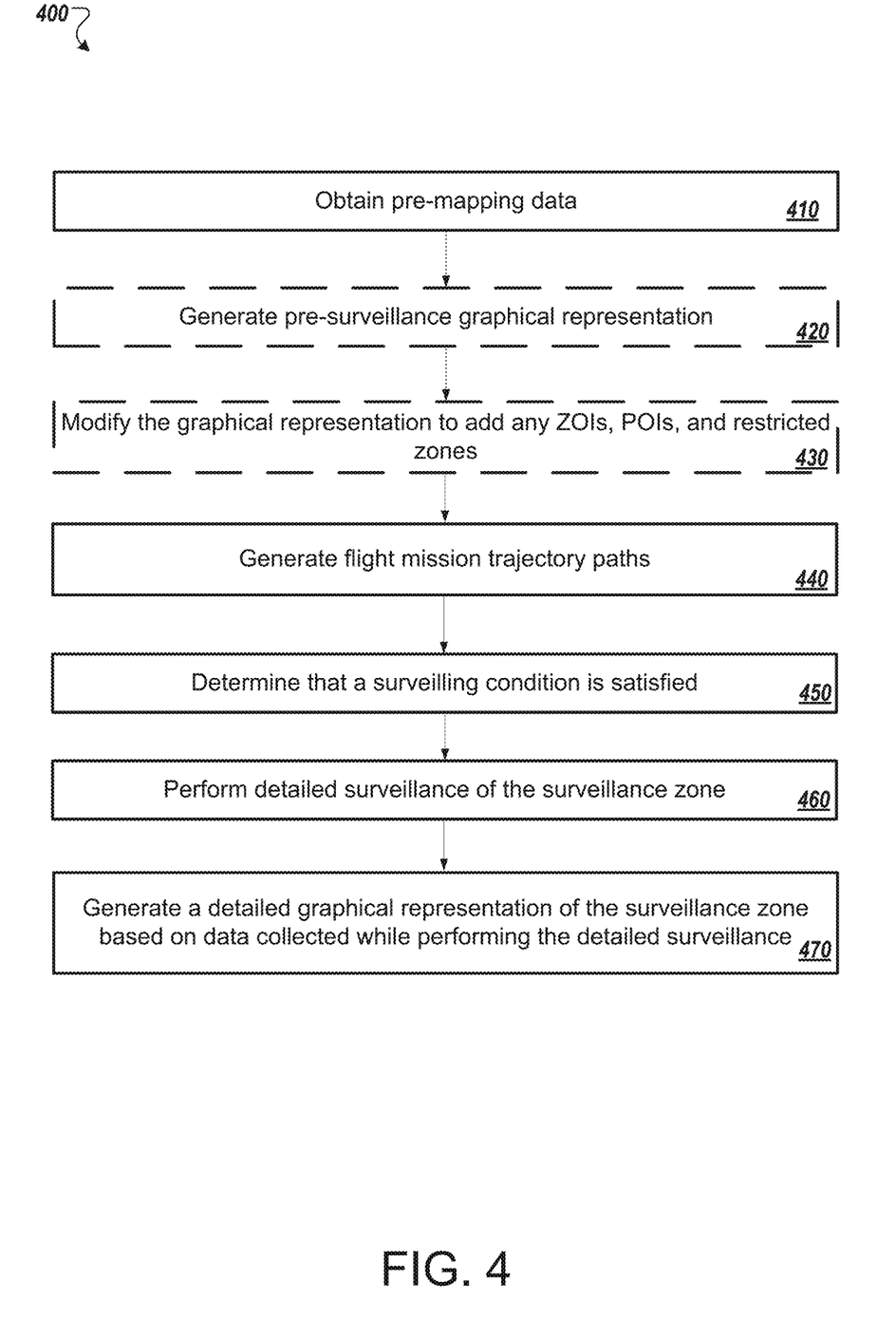
FIG. 4 depicts a flowchart of an example process to surveil a building space using a SCD.

FIG. 4 depicts a flowchart of an example process 400 to perform surveillance of an area using a SCD. To begin surveilling an area, the SCD may receive an indication that a user is interested in surveilling an area. As explained above, the SCD may receive the indication as an input through a graphical user interface located on the SCD, the SCD's base station, or a user device. In some implementations, the user may specify a type of pre-surveillance path to record. For instance, the user may select a perimeter path if the user intends to move the SCD along a perimeter of an area. In some cases, the user may select a traversal path if the user intends to move the SCD through an area to be surveilled. The SCD may configure a pre-surveillance operation based on the user's selection. For instance, if a perimeter path is selected, the SCD may prepare to obtain location coordinates along a perimeter of a surveillance zone. The SCD may be prepared to detect when the SCD is re-oriented 90° to determine the corners of the perimeter. If a traversal path is selected, the SCD may configure itself to take images of buildings and landmarks when the SCD is moved along the path. The images may be used to obtain data of the environment along the traversal path. In general, various types of pre-surveillance paths may be selected including, but not limited to, a crisscross path, a circular path, and a linear path.

The SCD may then wait to receive an indication from the user that the user has placed the SCD at the initial point where the user would like to begin surveillance. The indication may be a confirmation received through the graphical user interface that the user has placed the SCD at its starting position or initial point. In some implementations, the SCD may determine that its current location is the initial point. The coordinates of the initial point may be provided by the user or determined using a location determining system such as GPS. The SCD may also activate its sensors, cameras, radars, and other components to ensure that data is collected during the pre-surveillance phase.

In some implementations, the SCD may begin to obtain pre-surveillance data (410) as soon as it detects movement from the initial point and contact with the hands of a person. In some implementations, the SCD may begin to obtain pre-surveillance data (410) in response to instructions received from the user, the base station, or a security network server. The pre-surveillance data obtained may include one or more of images or videos captured by the camera, data obtained by one or more sensors of the SCD such as temperature data, luminosity data, humidity data, and data indicative of the path that the user moved the SCD. Data indicative of the path that the user moved the SCD may include coordinate location information indicative of the path traveled by the SCD, elevation information indicative of the elevations at which the SCD moved, SCD orientation information indicative of the orientations of the SCD when moved by the user, and various other types of data that may include the path traversed by the SCD as well as the orientation of the SCD while the user was holding the SCD for the pre-surveillance phase.

Pre-surveillance data is obtained until an indication is received by the SCD that the pre-surveillance phase is complete. This indication may be, for example, when the SCD stops moving for a determined period of time, e.g., 5 minutes. In some implementations, a user may provide an input indicating that the pre-surveillance is complete. In some implementations, when the SCD is returned to its base station, the SCD determines that the pre-surveillance phase is complete.

In some implementations, after obtaining the pre-surveillance data, the SCD may build and store a preliminary two or three-dimensional graphical representation, e.g., a 2-D or 3-D map, of one or more portions of the surveillance zone which the user walked through or around while holding the SCD or remotely controlling the SCD (420). The graphical representation may be generated based on pre-surveillance data collected by sensors of the SCD and/or the location coordinates of the various points traversed by the SCD during the pre-surveillance phase.

The user may modify the graphical representation by providing labels or identifying obstacles in the surveillance zone that have not been clearly identified yet (430). For instance, the user may identify a location of a building, tree, or wall on the map and label it accordingly. In some implementations, the user may annotate a preliminary map by identifying points of interest (POI), zones of interest (ZOI), and restricted zones, as described above. In some implementations, any area of a surveillance zone that the SCD did not move through by the user's movement during the pre-surveillance phase may be determined to be a restricted zone.

After any optional modifications to the generated map or graphical representation have been made, the SCD may generate flight mission trajectory paths for moving the SCD from any one location in the surveilled zone to another location other than the restricted zone(s) (440). For example, the SCD may generate a trajectory path from the SCD's base position to one of the POIs, such as a pond. In some implementations, the flight mission trajectory path may have the same starting and terminating point.

The generated flight paths may be provided to the user through a GUI, such as a web page, computer software GUI, or mobile application GUI, so that the user may view, edit and/or delete generated flight paths. In some implementations, the user may use graphic tools to draw new flight paths, edit exiting flight paths, or share the flight paths with the SCD, cloud-based system, or security monitoring system.

The generated and/or modified flight paths may be stored on-board on the SCD or off-board, for example in the cloud-based system or a storage system in the security monitoring system.

In some implementations, the various generated flight paths may be tagged with metadata providing information on the path such as its originating location, terminating location, areas or zones traversed, and any priorities associated with the trajectory path. For example, in some implementations, the flight path taken by the user during the pre-surveillance phrase, as shown in FIG. 1, may be designated as a preferred path. Additionally, environmental data may also be tagged to the flight paths. The environmental data may include data indicative of obstacles (e.g., fences and other objects) that may be within a threshold distance of the flight path, and data indicative of the climate in a surveillance zone such as temperature, humidity, and/or pressure.

In some implementations, metadata and environmental data may continuously be collected and updated from the time of pre-surveillance to the times when the flight paths are traversed by the SCD. The collected data may be processed to determine optimized paths—that is, paths that may be safer or more user friendly than other flight path options. In this manner, the data regarding a flight path is continuously updated and may be used to generate safe and optimized flight paths.

Next, the SCD may determine whether or not a surveilling condition is satisfied (450). The surveilling condition may be satisfied in various ways. For example, in some cases, the SCD may be programmed to surveil a zone periodically or according to a particular schedule. Thus, when the scheduled time or periodic time period is reached, the SCD may determine that a condition to initiate detailed surveillance of the surveillance zone has been satisfied.

In some implementations, the surveilling condition may be satisfied when the SCD receives data indicating that the user is interested in performing detailed surveilling. In some implementations, the surveilling condition may be satisfied when an alarm event occurs. If the SCD determines that a mapping condition is not satisfied, the SCD does not perform a detailed surveilling operation and may remain idle or perform any other suitable operation such as an operation to charge the SCD.

If the SCD determines that a surveilling condition is satisfied, the SCD performs detailed surveillance of the surveillance zone (460). For example, the SCD may be instructed by its own processor or from a security monitoring server to travel on one or more of the determined flight mission trajectory paths. In some implementations, the SCD may sequentially travel through each of the generated trajectory paths. In some implementations, the SCD may receive data indicating a user preference for the SCD to travel according to one or more of the generated trajectory paths. In some implementations, the SCD may be configured to travel along the trajectory path that is closest to the location of a reported alarm event. For example, if a gun firing incident or a fire is suspected to have occurred in an area, the SCD may select the trajectory path that goes to the area where the event occurred using the shortest route. In some implementations, the detailed mapping may be performed as described above with respect to FIGS. 2 and 3.

As the SCD travels along a trajectory path, the SCD may continue to collect data through its sensors and update the preliminary map or graphical representation based on the collected data. In some implementations, data collected as the SCD travels along the trajectory path may be used to provide additional information regarding an alarm event. For example, if an alarm event is triggered based on a fire, the SCD may be able to provide more information (e.g., images) on which parts of a building or surveillance zone are under threat or have already been damaged by the fire. This information may be sent to the security monitoring system or user device and may help facilitate a response to the alarm event.

After the detailed mapping phase is complete, the data collected during the detailed surveillance is processed to generate a detailed graphical representation such as a detailed map of the surveillance zone (470). In some implementations, graphical representation may be a two dimensional representation, a three dimensional representation, or another type of graphical representation of the surveilled zone.

In some implementations, the SCD may attempt to validate the generated graphical representation by a human operation or other computing devices as described above. After validation, the SCD may modify the graphical representation based on input received from the user, the SCD sensors, or other computing devices.

Other modifications may be made by using artificial intelligence or machine learning or based on data received from sensors, as described above. For example, a sensor that is part of a security monitoring system may provide its location to the SCD through the security monitoring system. The SCD may then add a representation of the sensor at a corresponding location in the graphical representation.

Although several of the data processing operations have been described above as being performed by the SCD, these data processing operations may be executed on board the SCD or off board. For example, the processing may occur at another component of the security monitoring system and/or in the cloud. For example, the SCD may be equipped with a communication circuit to communicate data directly to the cloud. In some implementations, the SCD may communicate the data to the base station, and the base station may be configured to communicate the data to the cloud or another component of the security monitoring system.

Figure 5:
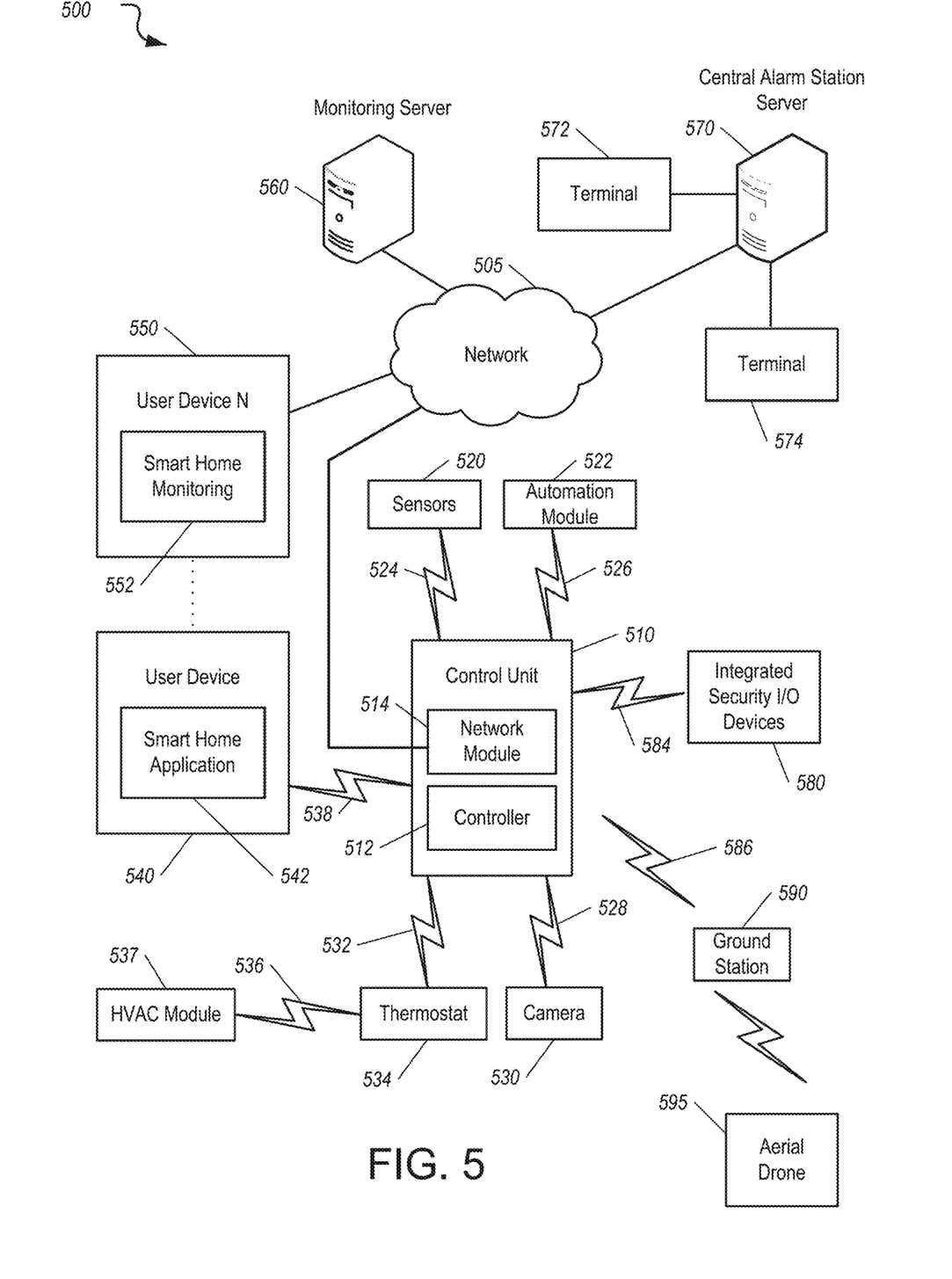
FIG. 5 depicts a block diagram of a security monitoring system.

FIG. 5 illustrates a block diagram of an example security monitoring system 500. The monitoring system 500 includes a network 505, a control unit 510, one or more user devices 540, 550, a monitoring server 560, and a central alarm station server 570. In some examples, the network 505 facilitates communications between the control unit 510, the one or more user devices 540, 550, the monitoring server 560, and the central alarm station server 570. This example further includes a drone system that includes a base station 590 and an aerial drone 595. In some implementations, the control unit 510 can communicate the base station 590, the aerial drone 595, or both via a communication link 586 to provide event information such as an alarm event. The aerial drone 595 can be configured to launch based on receiving an alarm event.

The network 505 is configured to enable exchange of electronic communications between devices connected to the network 505. For example, the network 505 can be configured to enable exchange of electronic communications between the control unit 510, the one or more user devices 540, 550, the monitoring server 560, and the central alarm station server 570. The network 505 can include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 can include multiple networks or subnetworks, each of which can include, for example, a wired or wireless data pathway. The network 505 can include a circuit-switched network, a packet-switched data network, or any other network able to carry electronic communications (e.g., data or voice communications). For example, the network 505 can include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 can include one or more networks that include wireless data channels and wireless voice channels. The network 505 can be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 can include a processor or other control circuitry configured to execute instructions of a program that controls operation of a control unit system. In these examples, the controller 512 can be configured to receive input from sensors, flow meters, or other devices included in the control unit system and control operations of devices included in the household (e.g., speakers, lights, doors, etc.). For example, the controller 512 can be configured to control operation of the network module 514 included in the control unit 510.

The network module 514 is a communication device configured to exchange communications over the network 505. The network module 514 can be a wireless communication module configured to exchange wireless communications over the network 505. For example, the network module 514 can be a wireless communication device configured to exchange communications over a wireless data channel and a wireless voice channel. In this example, the network module 514 may transmit alarm data over a wireless data channel and establish a two-way voice communication session over a wireless voice channel. The wireless communication device can include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also can be a wired communication module configured to exchange communications over the network 505 using a wired connection. For instance, the network module 514 can be a modem, a network interface card, or another type of network interface device. The network module 514 can be an Ethernet network card configured to enable the control unit 510 to communicate over a local area network and/or the Internet. The network module 514 also can be a voice band modem configured to enable the alarm panel to communicate over the telephone lines of Plain Old Telephone Systems (POTS).

The control unit system that includes the control unit 510 includes one or more sensors. For example, the monitoring system can include multiple sensors 520. The sensors 520 can include a lock sensor, a contact sensor, a motion sensor, or any other type of sensor included in a control unit system. The sensors 520 also can include an environmental sensor, such as a temperature sensor, a water sensor, a rain sensor, a wind sensor, a light sensor, a smoke detector, a carbon monoxide detector, an air quality sensor, etc. In some examples, the sensors 520 can include a radio-frequency identification (RFID) sensor that identifies a particular article that includes a pre-assigned RFID tag.

The control unit 510 communicates with an automation module 522 and the camera 530 to perform monitoring. The automation module 522 is connected to one or more devices that enable home automation control. For instance, the automation module 522 can be connected to one or more lighting systems and can be configured to control operation of the one or more lighting systems. The automation module 522 can be connected to one or more electronic locks at the property and can be configured to control operation of the one or more electronic locks (e.g., control Z-Wave locks using wireless communications in the Z-Wave protocol. Further, the automation module 522 can be connected to one or more appliances at the property and can be configured to control operation of the one or more appliances. The automation module 522 can include multiple modules that are each specific to the type of device being controlled in an automated manner. The automation module 522 may control the one or more devices based on commands received from the control unit 510. For instance, the automation module 522 may cause a lighting system to illuminate an area to provide a better image of the area when captured by a camera 530.

The camera 530 can be a video/photographic camera or other type of optical sensing device configured to capture images. For instance, the camera 530 can be configured to capture images of an area within a building or within a residential facility 102-A monitored by the control unit 510. The camera 530 can be configured to capture single, static images of the area and also video images of the area in which multiple images of the area are captured at a relatively high frequency (e.g., thirty images per second). The camera 530 can be controlled based on commands received from the control unit 510.

The camera 530 can be triggered by several different types of techniques. For instance, a Passive Infra-Red (PIR) motion sensor can be built into the camera 530 and used to trigger the camera 530 to capture one or more images when motion is detected. The camera 530 also can include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the automation module 522, etc.) to improve image quality when the scene is dark. An integrated or separate light sensor can be used to determine if illumination is desired and may result in increased image quality.

The camera 530 can be programmed with any combination of time/day schedules, system "arming state," or other variables to determine whether images should be captured or not when triggers occur. The camera 530 may enter a low-power mode when not capturing images. In this case, the camera 530 may wake periodically to check for inbound messages from the controller 512. The camera 530 can be powered by internal, replaceable batteries if located remotely from the control unit 510. The camera 530 may employ a small solar cell to recharge the battery when light is available. Alternatively, the camera 530 can be powered by the controller's 512 power supply if the camera 530 is co-located with the controller 512.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a property and/or environmental data at a property, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534.

A HVAC module 537 is connected to one or more components of an HVAC system associated with a property, and is configured to control operation of the one or more components of the HVAC system. In some implementations, the HVAC module 537 is configured to monitor energy consumption of the HVAC system components, for example, by directly measuring the energy consumption of the HVAC system components or by estimating the energy usage of the one or more HVAC system components based on detecting usage of components of the HVAC system. The HVAC module 537 can communicate energy monitoring information and the state of the HVAC system components to the thermostat 534 and can control the one or more components of the HVAC system based on commands received from the thermostat 534.

The system 500 further includes one or more integrated security devices 580. The one or more integrated security devices can include any type of device used to provide alerts based on received sensor data. For instance, the one or more control units 510 may provide one or more alerts to the one or more integrated security input/output devices. Additionally, the one or more control units 510 may receive one or more sensor data from the sensors 520 and determine whether to provide an alert to the one or more integrated security input/output devices 580.

Devices such as the sensors 520, the automation module 522, the camera 530, the thermostat 534, and the integrated security devices 580 communicate with the controller 512 over communication links 524, 526, 528, 532, 584, and 586. The communication links 524, 526, 528, 532, 584, and 586 can be a wired or wireless data pathway configured to transmit signals from the sensors 520, the automation module 522, the camera 530, the thermostat 534, and the integrated security devices 580 to the controller 512. The sensors 520, the automation module 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 584, and 586 can include a local network. The sensors 520, the automation module 522, the camera 530, the thermostat 534, and the integrated security devices 580, and the controller 512 may exchange data and commands over the local network. The local network can include 502.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 5 (CAT8) or Category 5 (CAT6) wired Ethernet network. The local network can be a mesh network constructed based on the devices connected to the mesh network.

The monitoring server 560 is an electronic device configured to provide monitoring services by exchanging electronic communications with the control unit 510, the one or more user devices 540, 550, and the central alarm station server 570 over the network 505. For example, the monitoring server 560 can be configured to monitor events (e.g., alarm events) generated by the control unit 510. In this example, the monitoring server 560 may exchange electronic communications with the network module 514 included in the control unit 510 to receive information regarding events (e.g., alerts) detected by the central alarm station server 570. The monitoring server 560 also may receive information regarding events (e.g., alerts) from the one or more user devices 540, 550.

In some implementations, the monitoring server 560 may route alert data received from the network module 514 or the one or more user devices 540, 550 to the central alarm station server 570. For example, the monitoring server 560 may transmit the alert data to the central alarm station server 570 over the network 505. The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540, 550.

The central alarm station server 570 is an electronic device configured to provide alarm monitoring service by exchanging communications with the control unit 510, the one or more user devices 540, 550, and the monitoring server 560 over the network 505. For example, the central alarm station server 570 can be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more user devices 540, 550 and/or the monitoring server 560.

The central alarm station server 570 is connected to multiple terminals 572 and 574. The terminals 572 and 574 can be used by operators to process alerting events. For example, the central alarm station server 570 may route alerting data to the terminals 572 and 574 to enable an operator to process the alerting data. The terminals 572 and 574 can include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a motion detection from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 can be mobile devices or devices designed for a specific function. Although FIG. 5 illustrates two terminals for brevity, actual implementations can include more (and, perhaps, many more) terminals. The one or more user devices 540, 550 are devices that host and display user interfaces. For instance, the user device 540 is a mobile device that hosts one or more native applications (e.g., the smart home application 542). The user device 540 can be a cellular phone or a non-cellular locally networked device with a display. The user device 540 can include a cell phone, a smart phone, a tablet PC, a personal digital assistant ("PDA"), or any other portable device configured to communicate over a network and display information. For example, implementations may also include mobile communication devices, tablets, electronic organizers, portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Google Android, Windows Mobile, etc. The smart home application 542 enables the user device 540 to receive and process image and sensor data from the monitoring system. The smart home application 642 may include a surveillance application described above through which the user may interact with a graphical user interface and provide inputs for performing the operations described above with respect to FIGS. 1-4.

The user device 550 can be a general-purpose computer (e.g., a desktop personal computer, a workstation, or a laptop computer) that is configured to communicate with the monitoring server 560 and/or the control unit 510 over the network 505. The user device 550 can be configured to display a smart home user interface 552 that is generated by the user device 550 or generated by the monitoring server 560. For example, the user device 550 can be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations can include more (and, perhaps, many more) or fewer user devices.

In some implementations, the one or more user devices 540, 550 communicate with and receive monitoring system data from the control unit 510 using the communication link 538. For instance, the one or more user devices 540, 550 may communicate with the control unit 510 using various local wireless protocols such as Wi-Fi, Bluetooth, Zwave, ZigBee, HomePlug (Ethernet over powerline), or wired protocols such as Ethernet and USB, to connect the one or more user devices 540, 550 to local security and automation equipment. The one or more user devices 540, 550 may connect locally to the monitoring system and its sensors and other devices. The local connection may improve the speed of status and control communications because communicating through the network 505 with a remote server (e.g., the monitoring server 560) can be significantly slower.

Although the one or more user devices 540, 550 are shown as communicating with the control unit 510, the one or more user devices 540, 550 may communicate directly with the sensors 520 and other devices controlled by the control unit 510. In some implementations, the one or more user devices 540, 550 replace the control unit 510 and perform the functions of the control unit 510 for local monitoring and long range/offsite communication.

In other implementations, the one or more user devices 540, 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540, 550 through the network 505. In this regard, the monitoring server 560 may facilitate communication between the one or more user devices 540, 550 and the monitoring system.

In some implementations, the one or more user devices 540, 550 can be configured to switch whether the one or more user devices 540, 550 communicate with the control unit 510 directly (e.g., through link 538) or through the monitoring server 560 (e.g., through network 505) based on a location of the one or more user devices 540, 550. For instance, when the one or more user devices 540, 550 are located close to the control unit 510 and in range to communicate directly with the control unit 510, the one or more user devices 540, 550 use direct communication. When the one or more user devices 540, 550 are located far from the control unit 510 and not in range to communicate directly with the control unit 510, the one or more user devices 540, 550 use communication through the monitoring server 560.

In some implementations, the one or more user devices 540, 550 are used in conjunction with local sensors and/or local devices in a house. In these implementations, the system 500 includes the one or more user devices 540, 550, the sensors 520, the automation module 522, and the camera 530. The one or more user devices 540, 550 receive data directly from the sensors 520, the automation module 522, and the camera 530, and send data directly to the sensors 520, the automation module 522, and the camera 530. The one or more user devices 540, 550 provide the appropriate interfaces/processing to provide visual surveillance and reporting. In some implementations, the system 500 provides end users with access to images captured by the camera 530 to aid in decision making. The system 500 may transmit the images captured by the camera 530 over a wireless WAN network to the user devices 540, 550.

In some implementations, a state of the monitoring system and other events sensed by the monitoring system can be used to enable/disable video/image recording devices (e.g., the camera 530). In these implementations, the camera 530 can be set to capture images on a periodic basis when the alarm system is armed in an "Away" state, but set not to capture images when the alarm system is armed in a "Stay" state or disarmed. In addition, the camera 530 can be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images can be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented using one or more computer programs or non-transitory computer-readable storage media that includes instructions that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example, semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

Computer-readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program, also known as a program, software, software application, script, plug-in, or code, may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data in a single file dedicated to the program in question, or in multiple coordinated files. A computer program may be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Moreover, a computer may be embedded in another device, e.g., a tablet computer, a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be claimed as such, one or more features from a claimed combination may, in some cases, be excised from the combination, and the claimed combination may be directed to a sub-combination or variation of a sub-combination. For example, although the mapping operation is described as a series of discrete operations, the various operations may be divided into additional operations, combined into fewer operations, varied in order of execution, or eliminated, depending on the desired implementation.

Similarly, the separation of various system components in the embodiments described above should not be understood as requiring such separation in all embodiments, and it should be understood that the described program components and systems may generally be integrated together in a single software product or packaged into multiple software products. For example, although some operations are described as being performed by a processing server, one of more of the operations may be performed by other network components.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner. Additionally, the terms "about," "substantially," or "approximately" should be interpreted to mean a value within 10% of an actual value, for example, values like 3 mm or 100% (percent).

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

Examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure. Thus, particular implementations have been described. Other implementations are within the scope of the following claims. For example, the actions recited in the claims may be performed in a different order and still achieve desirable results.

What is claimed is:

1. A system comprising:
   one or more processors and one or more storage devices storing instructions that are operable, when executed by the one or more processors, to cause the one or more processors to perform operations comprising:
   receiving an input to initiate a pre-surveillance operation, the input indicating a type of pre-surveillance operation to be performed in the outdoor area;
   configuring a drone to obtain data based on the type of pre-surveillance operation to be performed;
   obtaining data indicative of environmental features in the outdoor area when the pre-surveillance operation is performed;
   obtaining location information indicative of a path taken by the drone during the pre-surveillance operation;
   generating a flight trajectory path for the drone using the data indicative of the environmental features in the outdoor area and the location information, wherein the flight trajectory path follows the path taken by the drone during the pre-surveillance operation within the outdoor area;
   controlling the drone to perform a surveillance of the outdoor area i) using one or more sensors included in the drone and ii) according to the flight trajectory path; and
   generating a graphical representation of the outdoor area based on data obtained from performing the surveillance of the outdoor area.

2. The system of claim 1, wherein generating the flight trajectory path for the drone based on the data indicative of the environmental features in the outdoor area comprises:
   obtaining elevation information indicative of elevations at which the drone moved during the pre-surveillance operation;
   determining location coordinates of an area in which the drone is not permitted to travel;
   determining location coordinates of an area in which the drone is permitted to travel; and
   generating the flight trajectory path such that the flight trajectory path traverses the area in which the drone is permitted to travel, and does not traverse the area in which the drone is not permitted to travel.

3. The system of claim 1, wherein the data indicative of environmental features in the outdoor area when the pre-surveillance operation is performed comprises:
   data indicative of a location or presence of one or more of a building, a fence, a tree, and a restricted area in the outdoor area;
   an image or video captured by a camera of the drone; and
   data indicative of one or more of temperature, luminosity, and humidity in the outdoor area.

4. The system of claim 1, wherein the operations comprise:
   determining that a surveilling condition is satisfied upon occurrence of one or more of:
   determining that an alarm event has occurred;
   receiving data indicating that a user is interested in mapping the outdoor area; or
   determining that a particular time for performing the surveillance of the outdoor area according to a particular schedule has been reached; and
   wherein the surveillance of the outdoor area is performed in response to the surveilling condition being satisfied.

5. The system of claim 1, wherein:
   the graphical representation comprises a three-dimensional map of the outdoor area; and
   the operations further comprise validating the graphical representation by comparing the graphical representation with a graphical representation stored in a database.

6. The system of claim 1, wherein the operations further comprise:
   generating a first graphical representation of the outdoor area;
   receiving data indicative of a point of interest and a no-fly zone in the outdoor area; and
   modifying the first graphical representation to include the point of interest, the no-fly zone, or both the point of interest and the no-fly zone.

7. The system of claim 6, wherein the flight trajectory path is generated using the modified first graphical representation.

8. The system of claim 1, wherein:
receiving an input to initiate a pre-surveillance operation comprises receiving an input indicating that the drone is to move along a perimeter of the outdoor area; and
configuring the drone to obtain data based on the type of pre-surveillance operation to be performed comprises configuring the drone to obtain location coordinates of the perimeter of the outdoor area.

9. The system of claim 1, wherein:
receiving an input to initiate a pre-surveillance operation comprises receiving an input indicating that the drone is to move along a travel path through the outdoor area; and
configuring the drone to obtain data based on the type of pre-surveillance operation to be performed comprises configuring the drone to obtain location coordinates of the travel path through the outdoor area in response to receiving the input indicating that the drone is to move along the travel path through the outdoor area.

10. The system of claim 9, wherein the operations further comprise:
determining a zone that was not traversed along the travel path through the outdoor area;
identifying the zone that was not traversed as a no-fly zone; and
determining the flight trajectory path such that the drone does not enter the no-fly zone.

11. A computer-implemented method, comprising:
receiving an input to initiate a pre-surveillance operation, the input indicating a type of pre-surveillance operation to be performed in the outdoor area;
configuring a drone to obtain data based on the type of pre-surveillance operation to be performed;
obtaining data indicative of environmental features in the outdoor area when the pre-surveillance operation is performed;
obtaining location information indicative of a path taken by the drone during the pre-surveillance operation;
generating a flight trajectory path for the drone using the data indicative of the environmental features in the outdoor area and the location information, wherein the flight trajectory path follows the path taken by the drone during the pre-surveillance operation;
controlling the drone to perform a surveillance of the outdoor area i) using one or more sensors included in the drone and ii) according to the flight trajectory path; and
generating a graphical representation of the outdoor area based on data obtained from performing the surveillance of the outdoor area.

12. The computer-implemented method of claim 11, wherein generating the flight trajectory path for the drone based on the data indicative of the environmental features in the outdoor area comprises:
obtaining elevation information indicative of elevations at which the drone moved during the pre-surveillance operation;
determining location coordinates of an area in which the drone is not permitted to travel;
determining location coordinates of an area in which the drone is permitted to travel; and
generating the flight trajectory path such that the flight trajectory path traverses the area in which the drone is permitted to travel, and does not traverse the area in which the drone is not permitted to travel.

13. The computer-implemented method of claim 11, wherein the data indicative of environmental features in the outdoor area when the pre-surveillance operation is performed comprises:
data indicative of a location or presence of one or more of a building, a fence, a tree, and a restricted area in the outdoor area;
an image or video captured by a camera of the drone; and
data indicative of one or more of temperature, luminosity, and humidity in the outdoor area.

14. The computer-implemented method of claim 11, comprising:
determining that a surveilling condition is satisfied upon occurrence of one or more of:
determining that an alarm event has occurred;
receiving data indicating that a user is interested in mapping the outdoor area; or
determining that a particular time for performing the surveillance of the outdoor area according to a particular schedule has been reached; and
wherein the surveillance of the outdoor area is performed in response to the surveilling condition being satisfied.

15. The computer-implemented method of claim 11, wherein:
the graphical representation comprises a three-dimensional map of the outdoor area; and
the operations further comprise validating the graphical representation by comparing the graphical representation with a graphical representation stored in a database.

16. The computer-implemented method of claim 11, comprising:
generating a first graphical representation of the outdoor area;
receiving data indicative of a point of interest and a no-fly zone in the outdoor area; and
modifying the first graphical representation to include the point of interest, the no-fly zone, or both the point of interest and the no-fly zone.

17. The computer-implemented method of claim 11, wherein:
receiving an input to initiate a pre-surveillance operation comprises receiving an input indicating that the drone is to move along a perimeter of the outdoor area; and
configuring the drone to obtain data based on the type of pre-surveillance operation to be performed comprises configuring the drone to obtain location coordinates of the perimeter of the outdoor area.

18. The computer-implemented method of claim 11, wherein:
receiving an input to initiate a pre-surveillance operation comprises receiving an input indicating that the drone is to move along a travel path through the outdoor area; and
configuring the drone to obtain data based on the type of pre-surveillance operation to be performed comprises configuring the drone to obtain location coordinates of the travel path through the outdoor area in response to receiving the input indicating that the drone is to move along the travel path through the outdoor area.

19. The computer-implemented method of claim 18, comprising:
determining a zone that was not traversed along the travel path through the outdoor area;
identifying the zone that was not traversed as a no-fly zone; and determining the flight trajectory path such that the drone does not enter the no-fly zone.

20. A non-transitory computer-readable storage medium comprising instructions, which, when executed by one or more computer processors, cause the one or more computer processors to perform operations comprising:
receiving an input to initiate a pre-surveillance operation, the input indicating a type of pre-surveillance operation to be performed in the outdoor area;
configuring a drone to obtain data based on the type of pre-surveillance operation to be performed;
obtaining data indicative of environmental features in the outdoor area when the pre-surveillance operation is performed;
obtaining location information indicative of a path taken by the drone during the pre-surveillance operation;
generating a flight trajectory path for the drone based on the data indicative of the environmental features in the outdoor area and the location information, wherein the flight trajectory path follows the path taken by the drone during the pre-surveillance operation;
controlling the drone to perform a surveillance of the outdoor area i) using one or more sensors included in the drone and ii) according to the flight trajectory path; and
generating a graphical representation of the outdoor area based on data obtained from performing the surveillance of the outdoor area.

* * * * *